United States Patent [19]

Gessler et al.

[11] 4,363,586

[45] Dec. 14, 1982

[54] BUNKER-DISCHARGE APPARATUS, ESPECIALLY FOR BULK MATERIAL

[75] Inventors: Hans Gessler, Aalen; Gottfried Marienfeld, Aalen-Wasseralfingen, both of Fed. Rep. of Germany

[73] Assignee: Schwäbische Hüttenwerke Gesellschaft mit beschränkter Haftung, Aalen-Wasseralfingen, Fed. Rep. of Germany

[21] Appl. No.: 93,820

[22] Filed: Nov. 13, 1979

[30] Foreign Application Priority Data

Nov. 13, 1978 [DE] Fed. Rep. of Germany ....... 2849141

[51] Int. Cl.$^3$ ............................................. B65G 65/00
[52] U.S. Cl. .................................. 414/311; 414/304; 222/280
[58] Field of Search ............... 414/311, 293, 300, 306, 414/310, 304; 198/616; 222/251–252, 265, 275, 280

[56] References Cited

U.S. PATENT DOCUMENTS

| 2,965,379 | 12/1960 | Ganley | 222/280 |
| 3,414,142 | 12/1968 | Kolze | 414/311 |
| 3,526,328 | 9/1970 | Garret et al. | 414/300 |
| 4,140,214 | 2/1979 | Pellhammer | 198/616 |
| 4,167,237 | 9/1979 | Hayashi | 222/280 |

Primary Examiner—Trygve M. Blix
Assistant Examiner—R. B. Johnson

Attorney, Agent, or Firm—Becker & Becker, Inc.

[57] ABSTRACT

A bunker discharge apparatus, especially for bulk material. The apparatus includes conveyor elements having a ladder form or shape and extending parallel to each other and movable back and forth, by way of a drive, in the conveying or feeding direction. The elements include rungs or crossbars arranged transverse to the conveying direction and wedge-shaped in cross section. The crossbars have a stroke or pusher surface at right angles in the conveyor direction to shear and push bulk material to discharge; counter to the conveying direction, the crossbars have a flat-inclined wedge surface which returns to starting location with minimum displacement of bulk material. A drop-out or discharge connection or connecting piece having a conveying element and arranged at right angles is provided below the ladder-formed conveying elements. At one end, the conveying elements are connected to hydraulic cylinders arranged in pairs, and at the opposite end they are guided directly or indirectly by diverting rollers, whereby at any given time, one-hydraulic cylinder is engaged completely by a timing member providing a cycle of operation, and the other hydraulic cylinder is only partially engageable therewith. Accordingly, all push or stroke forces are convertible into pulling forces, so that the conveyor elements, in operation, are continuously under tension or pulling stress which is adjustable to advance bulk material to discharge from the apparatus.

14 Claims, 8 Drawing Figures

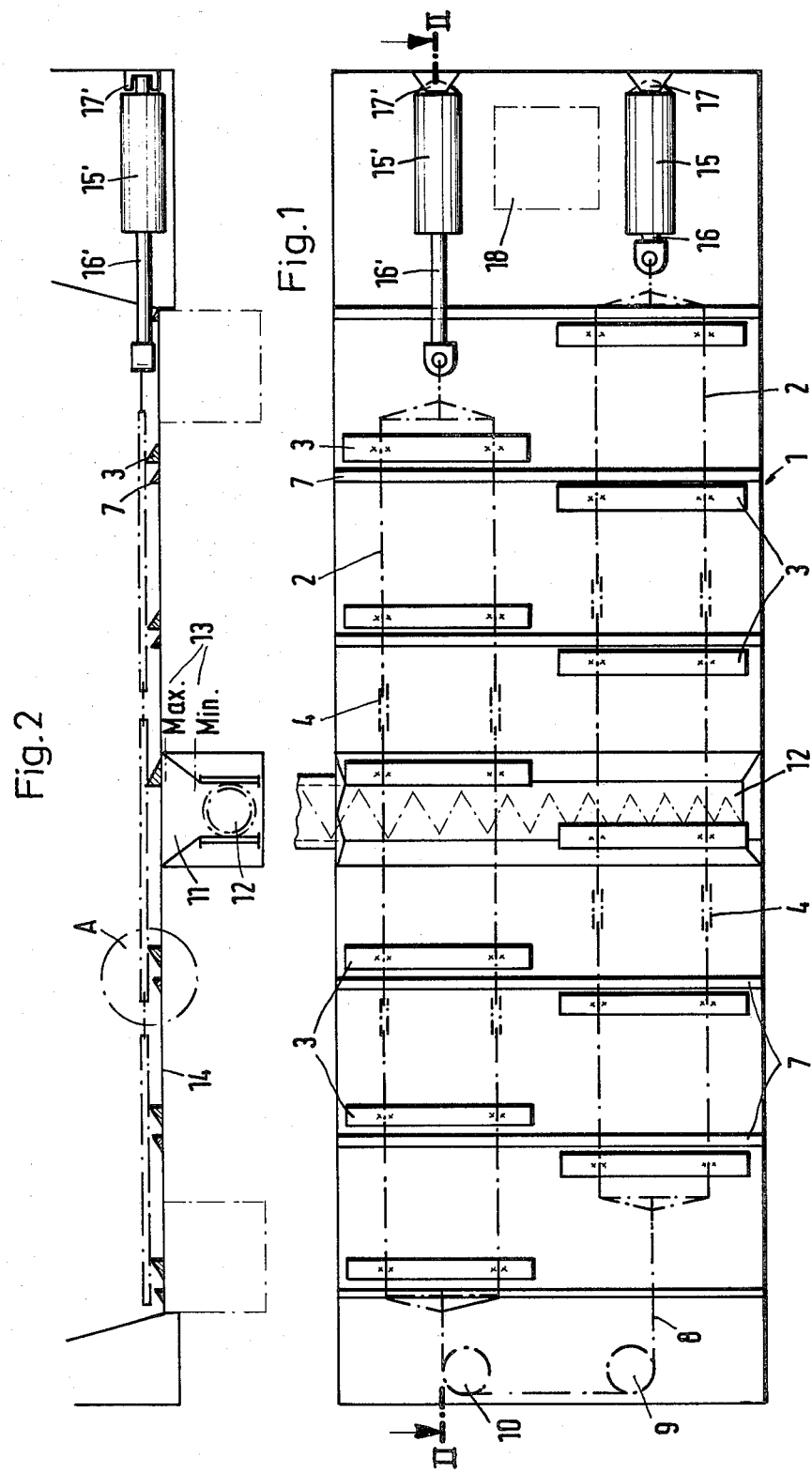

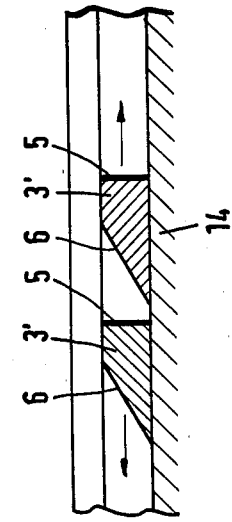
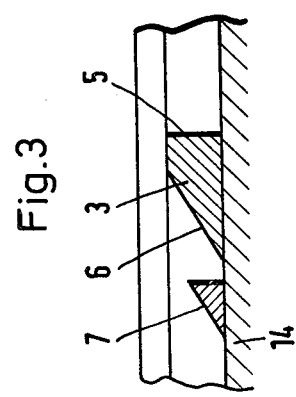
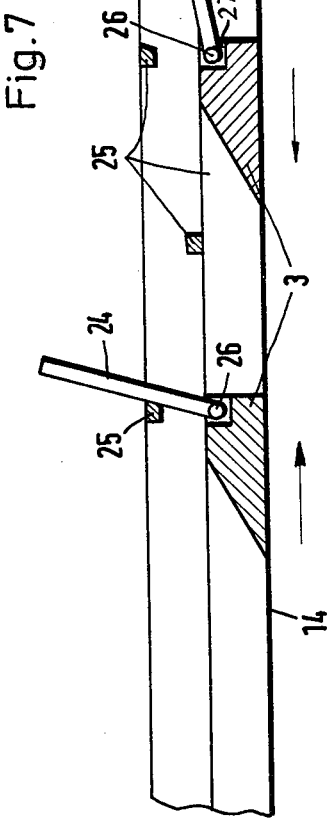
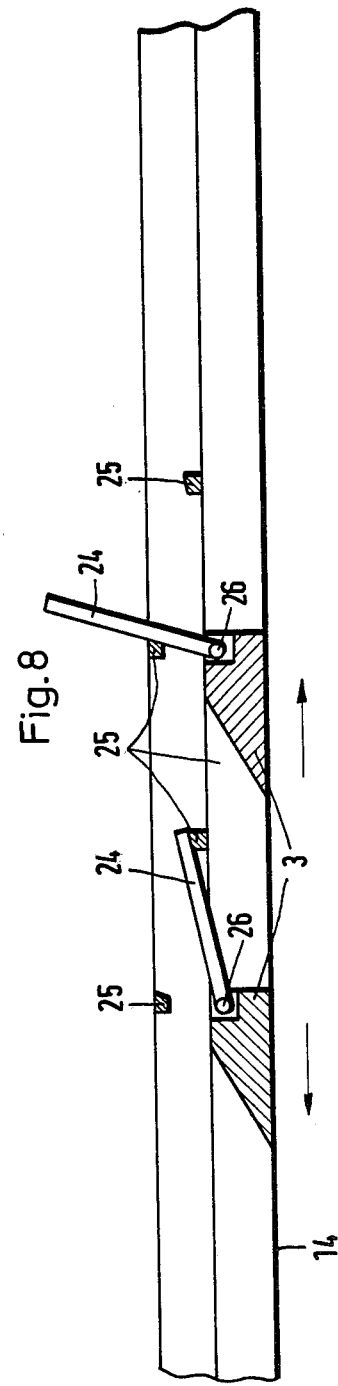

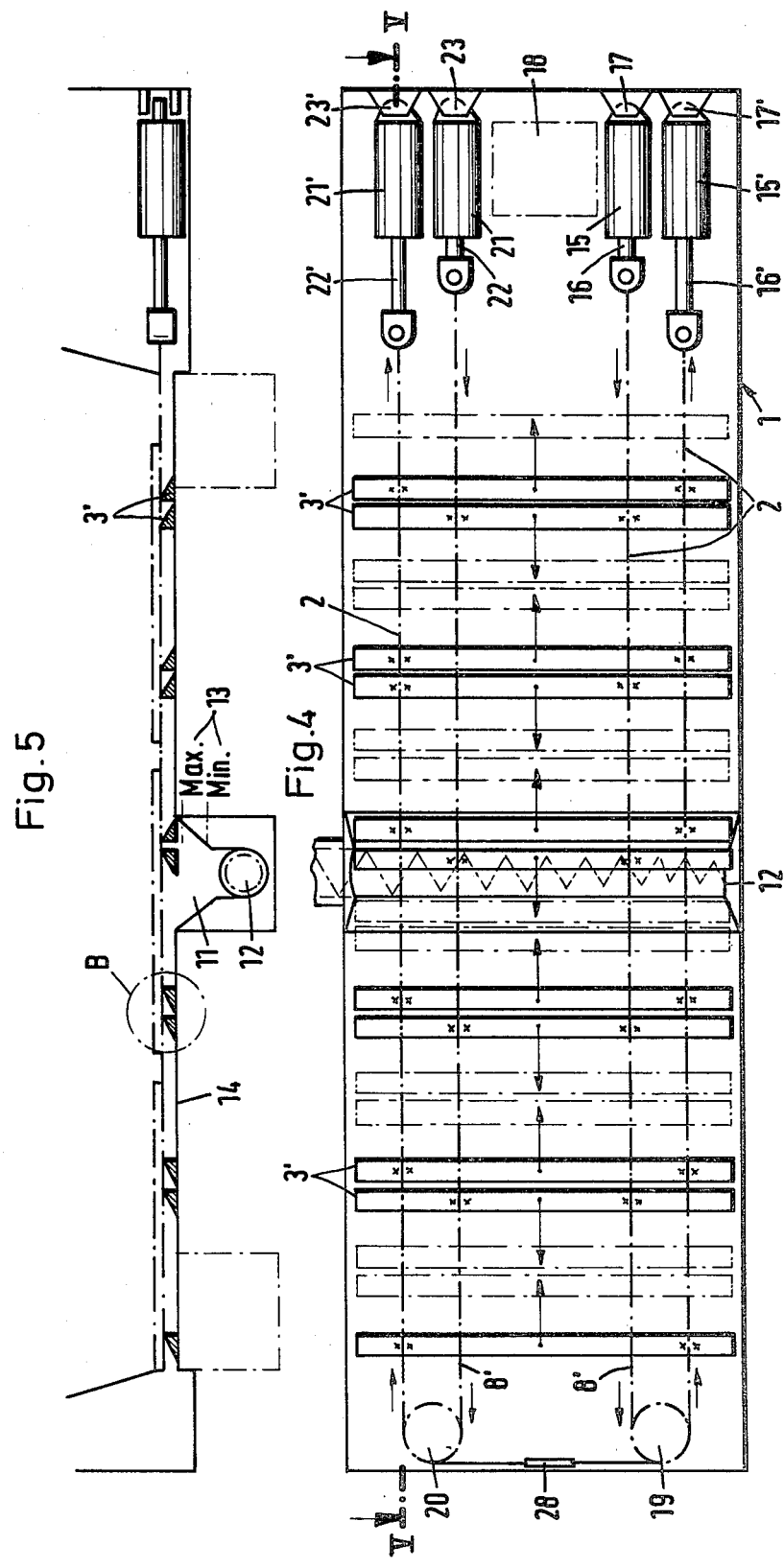

BUNKER-DISCHARGE APPARATUS, ESPECIALLY FOR BULK MATERIAL

The present invention relates to a silo, bin, or bunker discharge apparatus, especially for viscous bulk material, or materials which flow with difficulty. The apparatus includes conveyor elements having a ladder form and extending parallel to each other upon the ground or bottom or in the vicinity thereof, and movable back and forth, by way of a drive, in the conveying or feeding direction. The elements includes rungs or crossbars arranged transverse to the conveying direction and wedge-shaped in cross section. The crossbars have a stroke or pusher surface at right angles in the conveying direction, and, counter to the conveying direction, they have a flat-inclined wedge surface. Also included is a drop-out or discharge connection or connecting piece having a conveying element and arranged at right angles below the ladder-formed conveying elements.

With the different types of bunker or silo systems and other storage containers, most of all with large-surface cross section and quadratic or rectangular base or outline, there are used ladder-formed conveying elements which lie flat. The ladder-formed conveyor elements carry out a to and fro stroke or pusher movement in a predetermined conveying direction by way of a suitable drive, for example a shift or thrust crank drive or hydraulic cylinder. During forward or advance thrust, the perpendicularpusher or thrust surfaces of the rungs in the vicinity of the bottom, shear off a bulk material layer corresponding to the level of the thrust surfaces, and push or shift this sheared-off material intermittently forward along the stroke path to a drop-out connector or connecting piece arranged transverse to the conveying direction, from where the material is removed by suitable devices, for instance conveying worms or conveyor belts. During the return stroke, the bulk material is only slightly engaged due to the wedge-formed back side of the rungs. The rungs themselves shift back through the bulk material without taking the bulk material back again in the same measure or to the same extent as during the advance or forward stroke. For further reduction of the return flow of the bulk material during the return stroke, there are rungs or connecting pieces secured to the silo or bunker bottom. These so-called return flow baffle plates are arranged so that these plates do not hinder or preclude the back-and-forth movement of the rungs or connecting pieces, since the return-flow baffle plates are arranged suitably before or after the reversing points of the movable rungs or connecting pieces.

Such discharge or delivery devices require radius links or slide-guide means which are unprotected and uncontrollable and are completely surrounded by the bulk material which is to be poured, moved or dumped, so that these links or guides cannot be sufficiently lubricated and serviced. Such radius links or slide-guide means, for this reason, cause increased sliding resistance, which is rather disadvantageous in view of the thrust or stroke forces to be introduced, and consequently leads to increased wear. These links or slide-guide means, which must be embodied relatively accurately as a consequence of the large guide links, are expensive, susceptible to requiring repair, and give rise to increased energy requirements.

It is therefore an object of the present invention to provide a bunker-discharge apparatus with which every type of radius links or slide-guide means can be eliminated, and which is also suitable for delivery or discharge of bulk materials having a nominal bulk weight. The material can also be referred to as loose material capable of being poured or dumped.

These objects, and other objects and advantages of the present invention, will appear more clearly from the following specification in connection with the accompanying drawings, in which:

FIG. 1 is a plan view upon a bunker bottom with two conveying elements connected with each other by one pulling element;

FIG. 2 is a longitudinal section taken along line II—II in FIG. 1;

FIG. 3 is an enlarged illustration of the area A encircled in FIG. 2;

FIG. 4 is a plan view upon a bunker bottom with two conveying elements telescoped in each other;

FIG. 5 is a longitudinal section taken along line V—V in FIG. 4;

FIG. 6 is an enlarged illustration of the area B encircled in FIG. 5;

FIG. 7 is a vertical cross section through two rungs with a thrust element; and

FIG. 8 shows the rungs and thrust element of FIG. 7 but in a different positioning of the thrust element.

The apparatus of the present invention is characterized primarily in that the conveying elements are connected at one end to hydraulic cylinders arranged in pairs, and at the opposite end are guided directly or indirectly by diverting rollers. At any given time, one-hydraulic cylinder is engaged completely by a timing member providing a cycle of operation, and the other hydraulic cylinder is partially engageable thereby. Accordingly, all push or stroke forces are convertible into pulling forces, so that the conveyor elements, in operation, are continuously under tension or pulling stress which is adjustable.

All lift or stroke forces are converted into pulling or tension forces by the present invention, so that the ladder-formed conveyor elements during operation are continuously under tension or pulling stress which is adjustable. Consequently, the conveying elements always have the tendency and make an effort in both planes to arrange or align themselves in the thrust or pulling axes, so that the conveying elements form the particular shortest connection between the Cardanic suspended hydraulic cylinders and the diverting rollers. However, the conveying elements have the possibility of adapting or matching themselves in both planes to the conditions of the bulk material since no longitudinal links or guide means are provided. Conveying elements consequently can be temporarily shunted laterally or in elevation, for example under the influence of a non-uniform bulk material structure and/or the bulk material storage arrangement, in order to return again into the normal position upon normalization of the bulk material structure and/or the bulk material storage arrangement.

Referring now to the drawings in detail, according to FIG. 1, two ladder-formed conveying elements, which extend parallel to one another, are arranged upon the bottom 14 of a rectangular silo or deep bunker 1 (underground structures). The ladder struts or handles 2 are formed of sectional steel, each consisting of three strut segments which are connected with each other by links 4. Rungs or crossbars 3 which are wedge-shaped in cross section are arranged transverse to the conveying direction of the ladder struts 2 in uniform spacing (see also FIG. 3). These rungs 3 have a perpendicular thrust or pusher surface 5 in the conveying direction, and a flat inclined wedge surface 6 counter to the conveying direction. Both ladder-formed conveying elements are connected respectively to a hydraulic cylinder means 15, 15'. At opposite ends remote from the hydraulic cylinders the conveying elements are connected with each other by a pulling element 8 loosely bendable as guided over two diverting rollers 9, 10. The hydraulic cylinders 15, 15' are suspended by Cardan linkage 17, 17'. One hydraulic cylinder is completely and the other hydraulic cylinder is partially engaged by the hydraulic pump 18 at a particular time. Due to the differential pressure, there results a tension or pulling force upon both ladder systems, by means of which a relative movement of the ladder system occurs relative to the bunker 1 and also to each other. After carrying out the stroke of the pistons 16, 16' which are adjustable in length, there occurs a reversal of direction of movement by reversing or changing of direction. Since both the stroke path and also the stroke speed are adjustable in a stepless manner by throttling of the oil quantity in the hydraulic pump 18, a very accurate dosing of the withdrawal capability is possible.

At right angles below the ladder-formed conveying elements there is provided a drop-out or discharge chute or duct 11 with a conveyor worm 12. This drop-out chute 11 is arranged centrally of the conveying elements. As apparent from FIG. 2, the rungs or connecting pieces 3, with their perpendicular pusher surfaces 5, at any given time are directed toward the drop-out chute 11; in other words, this means that the rungs have a positioning in which to the left of the drop-out chute 11 the pusher surfaces 5 are directed to the right, and to the right of the drop-out or discharge chute 11 the pusher surfaces are directed to the left. However, it is also readily possible to provide the discharge or drop-out chute 11 at a different location, for instance one chute respectively being located at both ends of the ladder-formed conveying elements. The perpendicular pusher surfaces 5 then would only have to be correspondingly directed or aligned. It is expedient in every case to embody the drop-out chute or member 11 as a bulk material reservoir and to arrange parallel connected fill-level detectors or recorders 13 for monitoring and measuring the bulk material filling level or condition. Such detectors or recorders 13 control the stroke or lift movement of the ladder-formed conveying elements by way of a regulating or control circuit, so that under filling or over filling of the discharge or drop-out chute 11 is avoided. Approximately at the end of the conveyor worm 12, there is arranged a baffle or deflector which exposes or releases a limited conveying cross section and which holds back bulk material stored in the drop-out or discharge chute 11 over the conveyor worm 12. By means of this embodiment or arrangement, a continuous bulk material delivery by the conveying worm 12 results in spite of the discontinuous bulk material advance or forward pushing by the ladder-formed conveying elements. Between each two movable rungs 3, a rung or crossbar 7 is securely anchored to the bunker bottom 14 as a back or return flow baffle plate which has the same cross section as the movable rung 3. As recognizable from FIG. 1, the rungs 7 are arranged respectively before the diverting or reversing points of the movable rungs 3, so that the to and fro movement of the rungs 3 is not hindered.

FIGS. 4 and 5 illustrate a further embodiment, according to which, by utilization of the conversion of thrust or pushing forces into pulling or tensioning forces by means of the deviating rollers 19, 20, two adjacent rungs 3' are moved back and forth with respect to each other. For this purpose, one rung 3' is respectively connected with both externally located ladder struts 2, the following rung 3' being connected with both inwardly located ladder struts or handles 2, or vice versa.

In a manner differing from the arrangement according to FIG. 1, the rungs 3' extend or project substantially over the bunker cross section, and accordingly over both ladder-formed conveying elements. A hydraulic cylinder means 15, 15'; 16, 16' is arranged at each ladder strut or handle 2 by way of or over the pertaining pistons 16, 16', 22, 22'. The four hydraulic cylinder means 15, 15'; 16, 16' are likewise suspended by Cardan linkages 17, 17'; 23, 23'. On the opposite side, the ladder struts or handles 2 are guided over the diverting rollers 19, 20 by pulling or tension elements, for instance rope or cable 8'. The diameter of the diverting rollers 19, 20 corresponds to the open spacing of or distance between the ladder struts or handles 2. The ladder struts or handles 2 can also be embodied entirely as bendably loose or slack pulling or tension elements, for instance as cables or ropes. This embodiment has an improved efficiency and effects an increased and more unitized withdrawal capability with the same stroke level and the same stroke speed. In the advance or forward stroke, each rung 3' transports or conveys the bulk material forwardly, and in the return stroke shifts below the bulk material without taking it along to the same extent, since the neighboring rung moves in the opposite direction and consequently serves as a return flow baffle plate. Accordingly, the rungs or baffles 7 fixed on the bunker bottom 14 as return flow baffle plates can be eliminated.

For increasing the stroke or pusher surface 5 of the rungs 3 or 3', a recess 27 is provided in the upper region of the stroke surface 5 as shown in FIGS. 7 and 8, and a strip-formed stroke or pusher element 24 is connected in the recess 27 by a link 26. During forward stroke or advancing, the pusher elements 24 open as far as abutment or engagement against the stop or abutment strip 25. During the return stroke, in contrast, the stroke elements 24 fold or collapse as far as abutment for engagement against a further abutment strip 25. Since the stroke elements 24 during a forward stroke are positioned substantially vertically, and during the return stroke are slightly inclined with respect to the horizontal, there results a considerable enlargement of the stroke surface, without the bulk material being additionally engaged during the return stroke. Thus, it is also possible to quickly and economically withdraw bulk materials with nominal bulk weight, such as chips or (wood) shavings, or residential refuse, with a corresponding portion of textiles or crumpled paper.

Between both diverting or deviating rollers 19, 20, there is advantageously provided a mechanical or hydraulic synchronizing device 28, as schematically illustrated in FIG. 4. This synchronizing device 28 causes the ropes or cables to run exactly the same or synchronously as to the path and speed thereof, so that inclined positioning of the rungs is avoided.

The present invention is, of course, in no way restricted to the specific disclosure of the specification and drawings, but also encompasses any modifications within the scope of the appended claims.

What we claim is:

1. A bunker-discharge apparatus, especially for bulk material which moves with difficulty, said apparatus comprising:

a housing having a bottom;

at least one set of conveyor elements, for moving said bulk material, arranged at least in the vicinity of said bottom of said apparatus, each set of conveyor elements being adapted to be driven back and forth in the conveying direction and including side members interconnected by crossbars arranged transverse to the conveying direction, thus providing a ladder shape, said crossbars being generally wedge-shaped in cross section, having a perpendicular pusher surface on that side facing the conveying direction, and a flat-inclined wedge surface on that side facing counter to the conveying direction;

a discharge unit, arranged below the level of said at least one set of conveying elements, including a conveyor member and arranged at right angles to the conveying direction of said at least one set of conveying elements;

at least one pair of hydraulic cylinders respectively operatively connected to said housing and one end of said at least one set of conveying elements;

diverting rollers respectively operatively connected to said housing at the other end of said at least one set of conveying elements for at least indirectly guiding same; and a timing member operatively connected to said hydraulic cylinders for providing a cycle of operation, said at least one set of conveying elements, said hydraulic cylinders, and said diverting rollers being operatively associated in such a way that at any given time at least one hydraulic cylinder is adapted to be fully engaged and at least another hydraulic cylinder is adapted to be partially engaged by said timing member, so that all push forces are convertible into pulling forces, and said at least one set of conveying elements, in operation, is continuously under adjustable pulling tension.

2. An apparatus according to claim 1, which includes a Cardan linkage operatively connected to said hydraulic cylinders and said housing.

3. An apparatus according to claim 1, in which said side members include at least two sections and linking means for interconnecting said sections.

4. An apparatus according to claim 1, in which said timing member is a hydraulic pump.

5. An apparatus according to claim 4, in which each hydraulic cylinder includes a piston operatively connected to a pertaining set of conveyor elements, and in which said hydraulic pump utilizes oil, the quantity of which is adapted to be altered to effect a stepped adjustment of the stroke length and speed of said pistons.

6. An apparatus according to claim 1, in which said discharge unit is a bulk material reservoir and includes parallel connected fill-level indicators adapted to control the stroke movement of said at least one set of conveying elements by means of a control circuit, and which includes a restrictor operatively connected to the discharge unit conveyor member for controlling the discharge of bulk material.

7. An apparatus according to claim 6, which includes two sets of conveyor elements arranged parallel to one another, one pair of hydraulic cylinders, with one hydraulic cylinder operatively connected to one end of each set of conveyor elements; two diverting rollers; and a bendable pulling element which interconnects those ends of said conveyor elements remote from said hydraulic cylinders and which passes over said diverting rollers to effect the guiding of said conveyor elements.

8. An apparatus according to claim 7, which, between each two movable crossbars of said conveyor elements, includes rungs fixedly secured to said bottom of said housing, and serving as return flow baffle plates, said rungs having substantially the same cross-sectional profile as said crossbars.

9. An apparatus according to claim 1, which includes one set of conveying elements, the crossbars of which extend over nearly the entire width of said apparatus, each two adjacent crossbars being selectively movable toward and away from one another.

10. An apparatus according to claim 9, which includes four substantially parallel sets of side members, with one of each two adjacent crossbars being connected to the two outer side members, and the other to the two inner side members, with the diameter of said diverting rollers corresponding to the spacing between two pertaining side members.

11. An apparatus according to claim 1, which, for at least some of said crossbars, includes a strip-like pusher element hingedly connected to the pertaining crossbar by a link.

12. An apparatus according to claim 11, in which said crossbars include a recess on that side thereof remote from said housing bottom, said links being mounted in pertaining recesses, and in which said conveyor elements include stop means for limiting the pivot angle of said pusher element.

13. An apparatus according to claim 12, in which said pusher elements are adapted to be substantially perpendicular during movement of the pertaining crossbar in the conveying direction, and are adapted to be slightly inclined to the horizontal during movement in the opposite direction.

14. An apparatus according to claim 1, which includes a synchronizing device operatively connected to said diverting rollers for equalizing the speed and stroke of the pertaining conveyor element parts.

* * * * *